J. H. GINTHER.
SMOKE CONSUMER.
APPLICATION FILED SEPT. 4, 1918.
1,311,224.
Patented July 29, 1919.
2 SHEETS—SHEET 1.
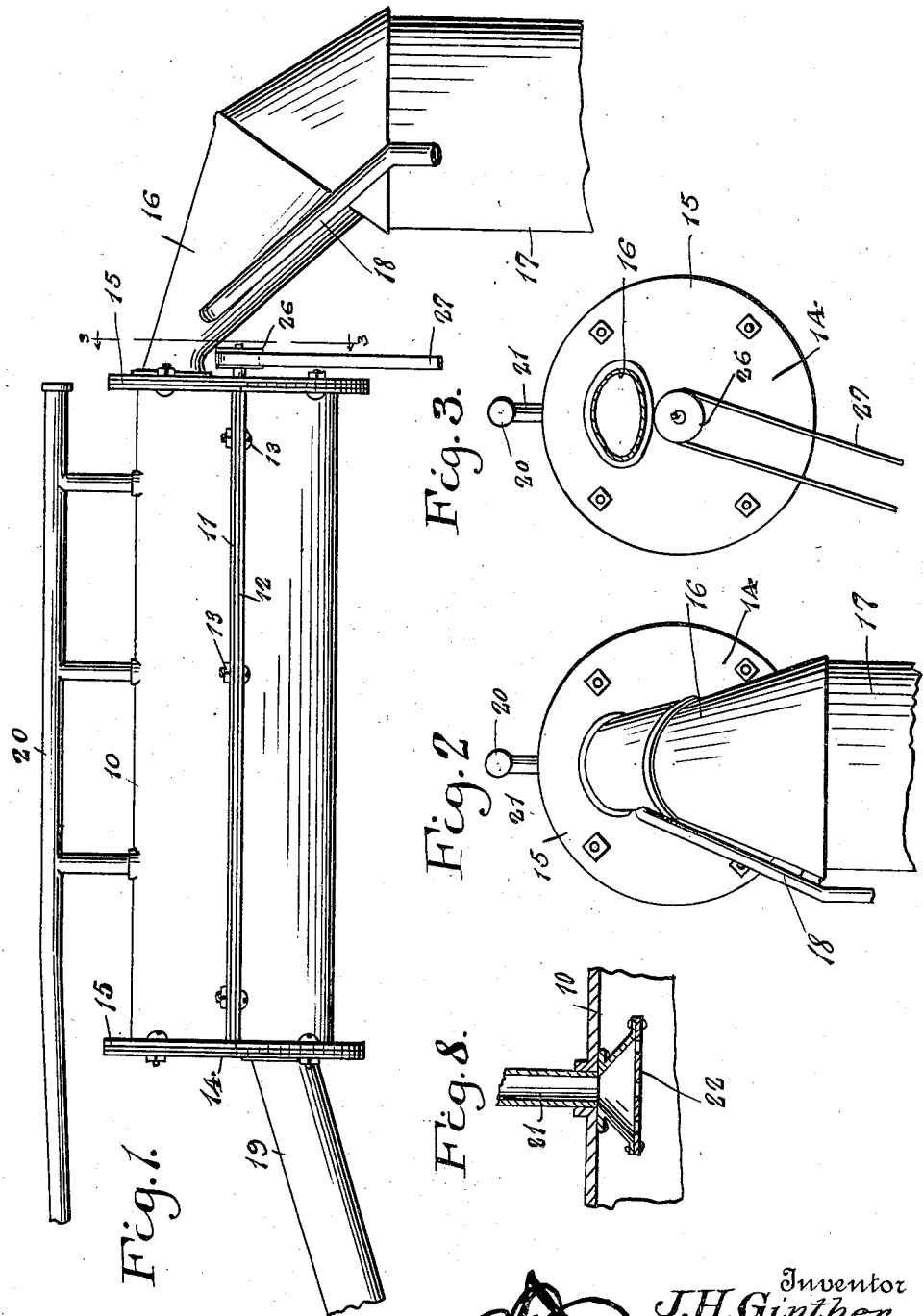
Inventor
J. H. Ginther J. H. GINTHER.
SMOKE CONSUMER.
APPLICATION FILED SEPT. 4, 1918.
1,311,224.
Patented July 29, 1919.
2 SHEETS—SHEET 2.
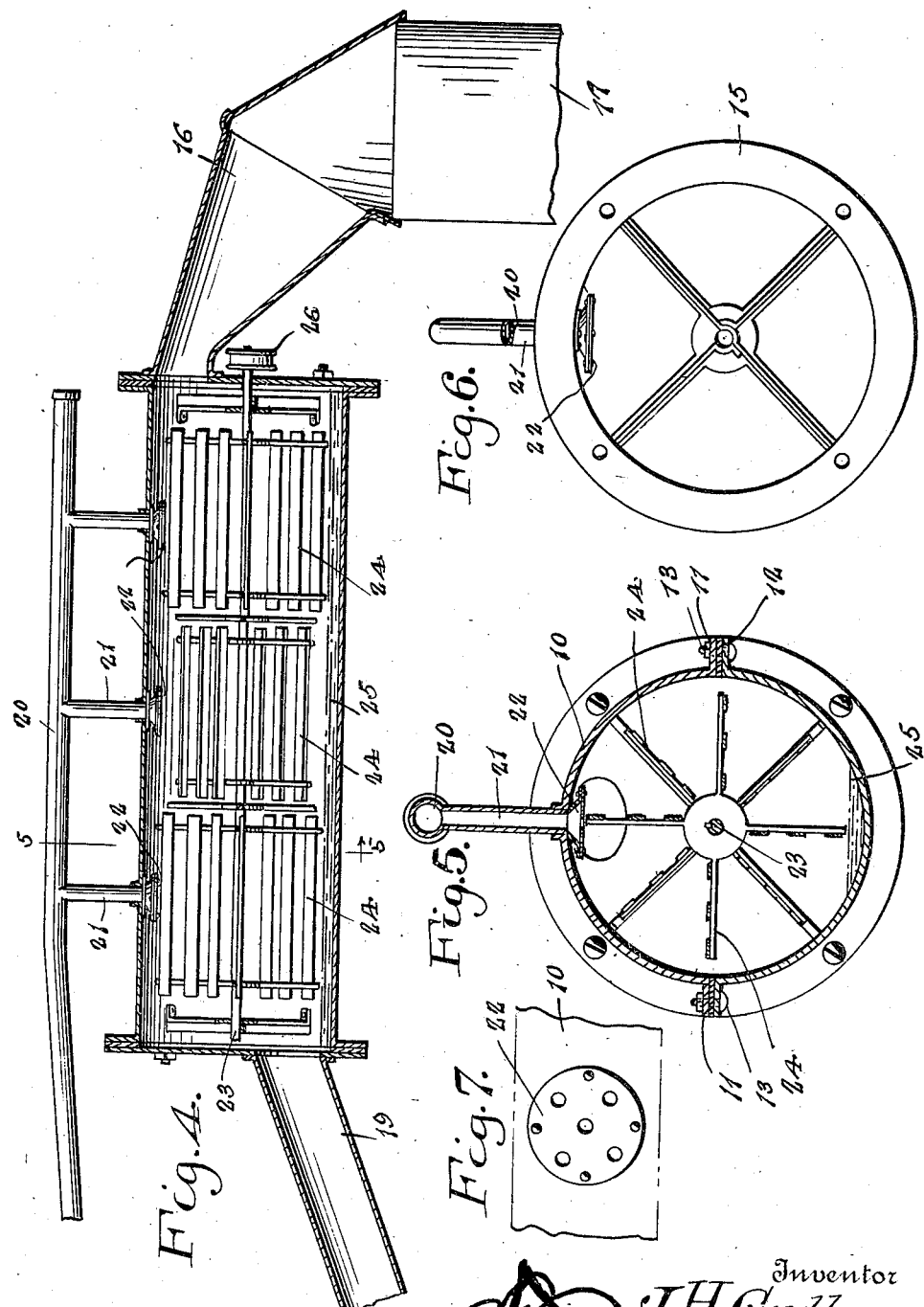

UNITED STATES PATENT OFFICE.

JOHN H. GINTHER, OF TAYLORVILLE, ILLINOIS.

SMOKE-CONSUMER.

1,311,224.　　　　Specification of Letters Patent.　　Patented July 29, 1919.

Application filed September 4, 1918. Serial No. 252,617.

*To all whom it may concern:*

Be it known that I, JOHN H. GINTHER, a citizen of the United States, residing at Taylorville, in the county of Christian and State of Illinois, have invented certain new and useful Improvements in Smoke-Consumers; and I do hereby declare the following to be a full, clear, and exact description of the invention, such as will enable others skilled in the art to which it appertains to make and use the same.

The object of the invention is to provide a simple and relatively inexpensive smoke consumer or apparatus for disposing of the solid ingredients of smoke, such as the unconsumed carbon, etc., by aqueous solution, precipitation or saturation, so that the mixture thereof in a floating state with the atmosphere may be prevented without detracting from the efficiency of the smoke or draft stacks of furnaces or other fuel consuming devices in connection with which the same may be used.

Further objects and advantages will appear in the following description, it being understood that changes in form, proportion and details may be resorted to within the scope of the appended claim without departing from the spirit of the invention.

In the drawing:

Figure 1 is a side view of an apparatus constructed in accordance with the invention, Fig. 2 is an end view of the same, Fig. 3 is a sectional view on the plane indicated by the line 3—3 of Fig. 1, Fig. 4 is a longitudinal sectional view of the apparatus, Fig. 5 is a transverse sectional view on the plane indicated by the line 5—5 of Fig. 4, Fig. 6 is an end view with one of the cap or head plates removed, Fig. 7 is a detail inverted plan view of one of the water distributing nozzles or outlets, Fig. 8 is a detail vertical sectional view of one of said outlets.

Essentially the apparatus embodies a drum or cylindrical trunk 10, having its cross sectionally semi-cylindrical sections jointed, as at 11, with suitable interposed packing 12 of asbestos, or the like, the flanges constituting the joints being secured together by means of bolts 13, or like fastening means, caps or head plates 14 being secured to the ends of said shell forming the body of the drum and being seated upon packing rings 15 to prevent lateral escape of fumes within the drum.

Communicating with the drum at one end through a suitable opening in the cap or head plate is an inlet funnel 16, which may be fitted over a stack 17, or a plurality of smoke outlet pipes and in communication with said inlet funnel is an air draft tube 18, serving to increase the draft through the stack and force the products of combustion escaping therefrom into the drum. At the opposite end of the drum is an outlet pipe 19, from which gases which are not destroyed or absorbed within the drum are permitted to escape, together with water which has served its purpose within the drum and has been admitted thereto through a water supply pipe 20, having branches 21 terminating within the drum in spraying outlets or nozzles 22. Located revolubly within the drum upon a central shaft 23 is a splash fan or paddle wheel 24 of which any desired number may be employed, (three being illustrated in the drawings), the spray from the said nozzles being distributed thereon so as to come into contact with smoke or other products of combustion passing through the drum from the inlet funnel to the outlet, a level of water indicated at 25 being maintained within the drum to receive the precipitate or sediment, consisting of carbon and other solid products thrown down by the water spray.

Any suitable means may be employed for the operation of the splash fans or paddles, as for example a pulley 26, may be arranged upon the shaft exteriorly of the drum to receive a belt 27, actuated by any suitable motor, or motive power, of which no illustration is deemed necessary in this connection, and in the same way any suitable blower mechanism may be used in connection with the air inlet or forced draft pipe 18, as, similarly any suitable means may be used to continuously supply water to the distributing pipe 20.

As will be noted more clearly from Figs. 4, 5 and 6, the nozzles 22 are positioned within the drum in alinement with the inlet opening and constitute baffles which tend to prevent flow of the smoke and products of combustion longitudinally of the drum at the upper portion thereof, thus imparting a tortuous or whirling motion to the smoke and products of combustion so as to cause the same to be engaged by the blades of the paddle wheels 24. Also, as will be noted more clearly from Fig. 4, the blades of the central paddle wheel 24 are positioned out of alinement with, or in staggered relation to, the blades of the adjacent paddle wheels. This insures that the products of combustion flowing through the drum will be caused to assume a tortuous path of travel and will be beaten down by the paddle wheels and thoroughly agitated so as to be effectually saturated by the water from spraying nozzles 22 thus insuring effectual separation of all particles of carbon and similar solid particles from the products of combustion, as well as the absorption of many of the gases contained in the products of combustion. As the inlet opening is positioned adjacent the top of the drum, and the outlet opening adjacent the bottom of the drum, thorough treatment of the products of combustion during the passage of the same through the drum is insured.

From the foregoing description it will be obvious that smoke entering the drum through the inlet nozzle, which preferably communicates with the drum at an elevated point, or near the top thereof, must pass through or around the splash fans or paddles where it is broken up and brought into contact with the water supplied from the spray nozzles and any vapor which is insoluble, and can not be precipitated, is forced to find an outlet through the pipe 19, which preferably communicates with the drum near the bottom thereof. Consequently the offensive distribution of unconsumed carbon representing dense smoke throughout the atmosphere adjacent to a factory, or establishment requiring the use of furnaces, is prevented, and many of the objectionable gases which are given off by factory stacks are dissolved or rendered relatively inoffensive by reason of contact with the spray within the drum, owing to the violent agitating effect of the paddles or fans, as hereinbefore explained.

Having thus described the invention, I claim:

A smoke consumer comprising a horizontally disposed drum having head plates, one of said plates being provided with an inlet opening located above the horizontal axis of the drum and having its upper wall coincident with the upper side thereof, and the other plate being provided with an outlet opening located below said horizontal axis and having its lower wall terminating above the lower wall of the drum to permit the drum to contain a quantity of water, a plurality of spraying nozzles located in the drum in alinement with and in the plane of said inlet opening and forming baffles, a supply pipe communicating with said nozzles, a shaft extending axially of the drum, a plurality of paddle wheels secured to said shaft, the blades of one of said wheels being arranged out of alinement with the blades of adjacent wheels, an inlet funnel communicating with said inlet opening, and an air draft pipe communicating with said funnel.

In testimony whereof I affix my signature in presence of two witnesses.

JOHN H. GINTHER.

Witnesses:
JOHN B. COLEGROVE,
LOUETTA B. ROBERTS.

Copies of this patent may be obtained for five cents each, by addressing the "Commissioner of Patents, Washington, D. C."